United States Patent Office 2,955,080
Patented Oct. 4, 1960

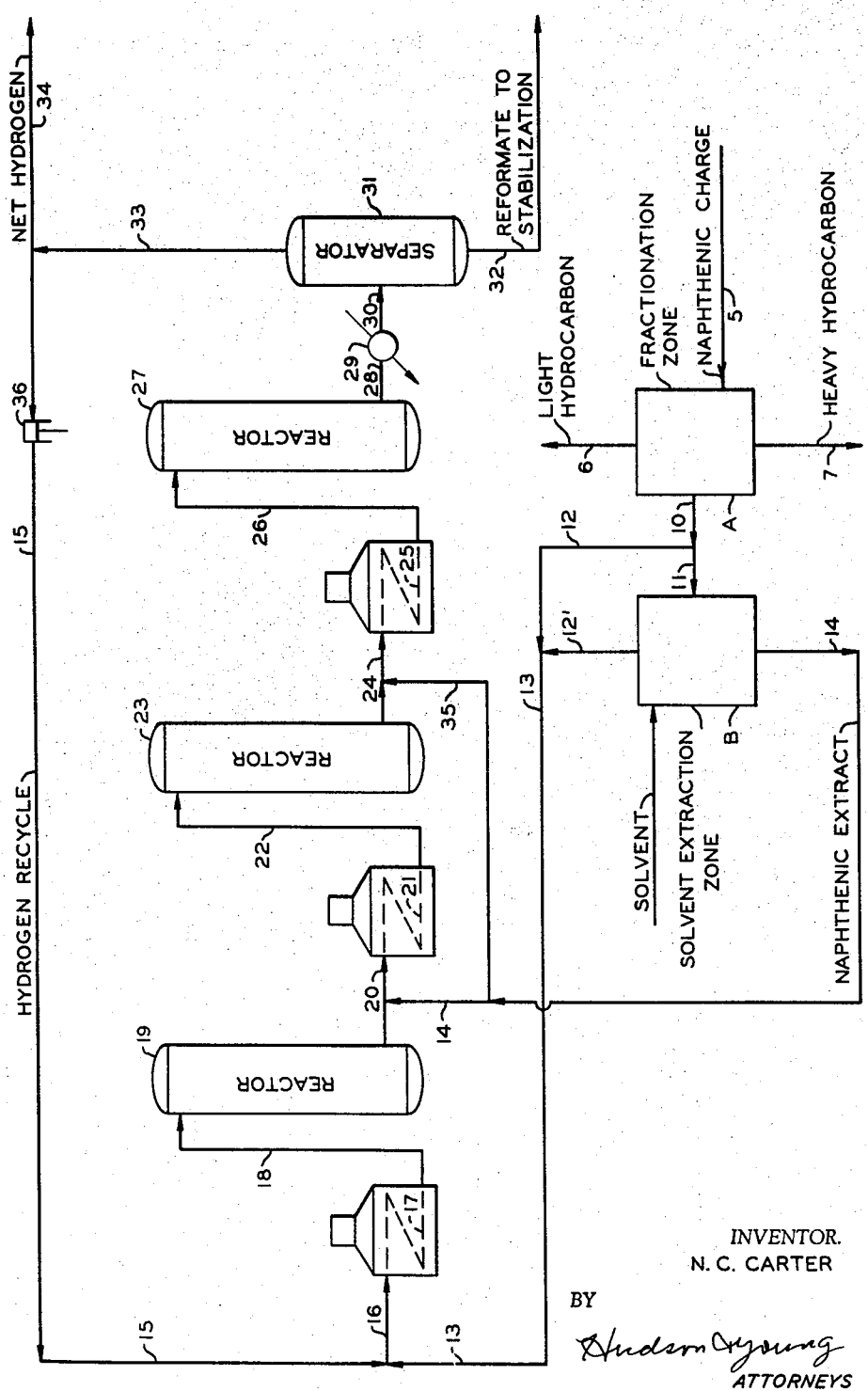

2,955,080

REFORMING PROCESS WHEREIN THE TEMPERATURES IN AND TEMPERATURE DROP ACROSS A REACTOR OR REACTORS ARE CONTROLLED

Norman C. Carter, Sweeny, Tex., assignor to Phillips Petroleum Company, a corporation of Delaware Filed July 31, 1958, Ser. No. 752,214

12 Claims. (Cl. 208—63)

This invention relates to reforming. In one of its aspects, the invention relates to reforming of a hydrocarbon stream, containing naphthenic hydrocarbon, in which stream the proportion of naphthenic hydrocarbon is controlled thereby controlling the temperatures in the reactor in which the reforming reactor is taking place. In another of its aspects, the invention relates to the control of the temperatures in and temperature drop across a reactor or reactors by controlling the naphthenic content of a charge fed to said reactor or reactors, in the case of a plurality of reactors, adjusting the naphthenic content of the charge to each reactor independently of the charge to any other reactor. In a further aspect, the invention subjects to a separation process, for example a solvent extraction operation, the naphthenic charge, to a reactor or reactors operated in series, to obtain a naphthenic concentrate and then supplies to the feed to each reactor an amount or proportion of said concentrate sufficient only to control the temperature in said reactor.

It is known to reform hydrocarbons. Among the reactions occurring when a hydrocarbon stream is subjected to reforming is aromatization due to dehydrogenation of naphthene molecules in the stream. In the dehydrogenation process or reaction, there is formed hydrogen believed to be at least initially in nascent form. I have found that by controlling the proportion of naphthenic hydrocarbon in the charge to a reforming reaction zone I can control the temperature in said zone. Moreover, I have discovered that in so doing, especially in the case of a plurality of reaction zones operated in series, I can considerably decrease very advantageously the coke laydown on the catalyst which is employed. This is due to the formation of fresh hydrogen, likely in nascent form, which is formed on the catalyst from the freshly introduced naphthenes, as in the concentrate above mentioned. I have further found that by controlling the naphthenics content of the stream to each of several reactors I can obtain a lower temperature drop across each of the reactor beds thus obtaining a narrow spread between the reactors' inlet temperatures. Since the reaction converting a naphthene to an aromatic is endothermic, it will be obvious from considerations herein that the temperature of the charge to, say, a first reactor need not be as high when a portion of the naphthenics is added to a later reactor as it must be when all the naphthenics are added to the first reactor. In other words, there is obtained not only a lower temperature drop across the first bed but the inlet temperatures to the second, third, etc. reactors in a series can be higher than conventional due to the increase of the naphthenics added to the feed to each of said second, third, etc. reactors. This, obviously, results in better and more effective operation of the system.

It is an object of this invention to reform a hydrocarbon. It is a further object of this invention to provide a method of controlling the temperature in a reactor or in a series of reactors employed in a hydrocarbon reforming operation. It is a further object of this invention to reduce the overall temperature drop through a series of reactors employed in reforming a hydrocarbon.

Other aspects, objects and the several advantages of this invention are apparent from a consideration of this disclosure, the drawing and the appended claims.

According to this invention, the temperature drop across a reforming zone is controlled by adjusting the content of naphthene in the feed to said zone. Further, according to the invention, there is provided a method of controlling the temperature and the temperature drop in and across several reforming zones by controlling the proportion of naphthene constituents of a charge material as it is fed serially through said zones. Further, according to the invention, a naphthenic hydrocarbon charge is solvent extracted to obtain a naphthenic concentrate and a raffinate containing some naphthenes, the raffinate is reformed in a reaction zone, a portion of naphthenic concentrate is added to the effluent from said zone and the mixture thus obtained reformed further in a second zone. Similarly, before reforming further in a third zone, another portion of naphthenic concentrate can be added to the effluent from the second reforming zone and so on.

It is within the scope of the invention to adjust the naphthenic concentration of the feed to a zone or to any zone in a series of zones by feeding from an outside source a naphthenic hydrocarbon to be charged to a given zone.

The invention will now be set forth, described and illustrated with respect to the reforming of a naphthenic gasoline. It will be understood that somewhat heavier hydrocarbon fractions can be reformed in similar manner. Further still, it will be understood that there can be added to the feed to the method externally available naphthenic material among which are included methylcyclohexane, dimethylcyclohexane and/or ethylcyclohexane, etc.

Referring now to the drawing, a naphthenic gasoline having an end point of 510° F. is charged at the rate of 790 barrels per hour via line 5 to prefractionation A. Light hydrocarbon boiling below about 150° F. is removed at about 120 barrels per hour via line 6 for further use as desired. Heavy hydrocarbon boiling above about 400° F. is removed at about 40 barrels per hour via line 7 for further use as desired. A hydrocarbon stream containing naphthenics is removed via line 10 at the rate of 630 barrels per hour. About 70 barrels per hour of this cut, boiling between about 150–400° F., is charged via line 11 to the conventional-type solvent extraction zone B. The remainder of the stock in line 10 at the rate of about 560 barrels per hour by-passes the extraction zone via line 12. In zone B, a naphthenic concentrate containing 60 to 75 volume percent naphthenics is produced and removed via line 14 at the rate of 40 barrels per hour and is processed as described below. A stream lean in naphthenics is removed from the top of zone B by line 12' at the rate of 30 barrels per hour and is combined with the 560 barrels of hydrocarbon from line 12. The combined stream containing 36 to 45 volume percent naphthenics is charged via lines 13 and 16 along with recycle hydrogen from line 15 added in sufficient quantity to produce a mol ratio of $H_2$/hydrocarbon of about 7:1 to 10:1 to heater 17. The combined stream after passing through the heater 17 is charged via line 18 to reactor 19. The inlet temperature to reactor 19 is 890° to 940° F., with a $\Delta T$ thereacross of 60 to 100° F. The effluent from reactor 19 passes out via line 20 and has added thereto, at the rate of about 20 barrels per hour, a naphthenics concentrate stream from line 14, above-described, which is quite rich in naphthenics and which controls the $\Delta T$ across the bed of reactor 23 to which it is fed by way of heater 21 and pipe 22. The inlet temperature to reactor 23 is 875 to 925° F., with a 35 to 45° F. temperature drop across the bed in reactor 23. The effluent from reactor 23 is passed via line 24 and has added thereto about 20 barrels per hour of the rich naphthenic stream introduced via line 35. The combined stream passes out via line 24 to heater 25 and is charged to reactor 27 via line 26. The inlet temperature to reactor 27 is about 870 to 920° F. with a temperature drop across the bed of the reactor of about 15 to 25° F. Effluent from reactor 27 is passed out via line 28 and condenser 29 and pipe 30 to separator 31 wherefrom unstabilized reformate is removed for further processing via line 32. A hydrogen-rich gas is removed via 33 and net hydrogen is recovered via 34. The remaining hydrogen stream for recycle is compressed and returned to the reactor system by way of pipe 15 which contains a compressor 36.

The flows of naphthenic concentrate into reactors 23 and 27 are not necessarily equal qualities. In some operations, less may be sent to reactor 23 and more to reactor 27, and vice versa.

It will be seen from the foregoing description that, according to the method of my invention, the volume percent of naphthenics is controlled in the feed to each of the three reactors and, therefore, in the reactors. This effects a lower temperature difference across the beds of each of the reactors producing the narrow spread between the inlet temperature of any one reactor and any other reactor in the system.

The following table of information constitutes a part of the foregoing example. It will be noted that designations at the top of each column apply to respective parts of the system.

other solvents which can be used include monomethyl and monoethyl ethers of ethylene glycol and diethylene glycol, methyl carbitol, etc.

The catalysts which will dehydrogenate naphthenes and reform hydrocarbons are also well known in the art. In the example described, the catalyst is a platinum-alumina-halogen catalyst, the platinum content being in the range of 0.05 to 1.5 weight percent, and the fluorine content being less than about 3.0 weight percent based on dry alumina.

It will be obvious to one skilled in the art in possession of this disclosure that it is within the scope of the claims to contact the proportion of naphthenic hydrocarbon in the feed to a given reactor responsive to the temperature in said reactor at any desired point therein. Thus, it is evident upon reading this disclosure that a proportioning pump or other means can be used to dose in, as it were, the desired proportion of naphthenic hydrocarbon responsive to energy supplied to the pump, flow of the energy being controlled by the temperature at said point in the reactor.

The tabulation below specifically compares a conventional reforming operation with the operation in accordance with my inventionn. In each operation, the hydrogen to hydrocarbon mol ratio is 7 to 1. The same reforming catalyst, as above described, is used in all of the reactors. The same naphthenic gasoline is charged to each: to the conventional operation at the rate of 630 barrels per hour serially through all three reactors and containing 42.1 volume percent naphthenics; and to the operation of my invention at the rate of 590 barrels per hour serially through all three reactors and containing 40.4 volume

*Table*

| Unit or Line No | 5 | 6 | 7 | 10 | 12 | 11 | 14 | 12' |
|---|---|---|---|---|---|---|---|---|
| Barrels/hour | 790 | 120 | 40 | 630 | 560 | 70 | 40 | 30 |
| Percent (Vol.) Naphthenics | | | | 37.5–46.8 | 37.5–46.8 | 37.5–46.8 | 60–75 | 7.7–9.3 |
| Bbls. Naphthenics | | | | 236.3–294.8 | 210–262 | 26.3–32.8 | 24–30 | 2.3–2.8 |
| Pressure, p.s.i.g. | | | | | | | | |
|   Top | | | | | | | | |
|   Bottom | | | | | | | | |
| Temperature, °F | | | | | | | | |
|   Top | | | | | | | | |
|   Bottom | | | | | | | | |
| H₂, MM s.c.f./day | | | | | | | | |
| Platformate, b./h | | | | | | | | |
| Mol percent H₂ | | | | | | | | |
| C₁ to C₅ H/C, Mol Percent | | | | | | | | |
| Boiling Range, °F | | <150 | >400 | 150–400 | 150–400 | 150–400 | 150–400 | 150–400 |

| Unit or Line No | 13 | A | 19 | 23 | 27 | 31 | 34 | 32 | 15 |
|---|---|---|---|---|---|---|---|---|---|
| Barrels/hour | 590 | | | | | | | | |
| Percent (Vol.) Naphthenics | 36–44.8 | | | | | | | | |
| Bbls. Naphthenics | 212.3–264.8 | | | | | | | | |
| Pressure, p.s.i.g | | | | | | 450 | | | |
|   Top | | | 20–60 | | | | | | |
|   Bottom | | | 25–65 | | | | | | |
| Temperature, °F | | | | | | 100 | | | |
|   Top | | | 250–280 | 890–940 | 875–925 | 870–920 | | | |
|   Bottom | | | 480–510 | 830–840 | 840–880 | 855–895 | | | |
| H₂, MM s.c.f./day | | | | | | | 5–12 | | |
| Platformate, b./h | | | | | | | | 569–600 | |
| Mol Percent H₂ | | | | | | | 80–95 | | 80–95 |
| C₁ to C₅ H/C, Mol Percent | | | | | | | 20–5 | not ported | 20–5 |
| Boiling Range, °F | 150–400 | | | | | | | | |

It will be evident to one skilled in the art in possession of this disclosure that the operation which has been described is for purposes of compliance with the patent laws and practice thereunder and is not to be taken by way of limiting the appended claims. It is clear that within the scope of the appended claims some variation and modification of the naphthenic charge treated and the conditions of treatment can be made. Solvents which can be employed in the solvent extraction step of the invention are well known in the art. In the example described herein, conventional furfural solvent is employed as the selective solvent for naphthenics; however, percent naphthenics, and adding to the second reactor and to the third reactor each 20 barrels per hour of the naphthenic concentrate containing 67.9 volume percent naphthenics, which concentrate was recovered from the original 630 barrels per hour of fresh charge, in accordance with my invention.

After running for equal periods of time, at the conditions of temperature in the reactors listed below, and producing substantially the same quality and quantity of reformate in each operation, i.e., 92.5 liquid volume percent of charge, compression of coke on the catalyst is made;

|  | Conventional | Invention |
|---|---|---|
| Wt. Percent Coke on Catalyst: | | |
| Reactor 19 | 1.2 | 1.5 |
| Reactor 23 | 2.4 | 1.9 |
| Reactor 27 | 2.6 | 2.2 |
| Inlet Temperature, °F.: | | |
| Reactor 19 | 915 | 905 |
| Reactor 23 | 895 | 900 |
| Reactor 27 | 880 | 892 |
| Outlet Temperature, °F.: | | |
| Reactor 19 | 830 | 835 |
| Reactor 23 | 865 | 860 |
| Reactor 27 | 875 | 875 |
| Differential Temp., °F.: | | |
| Reactor 19 | 85 | 70 |
| Reactor 23 | 30 | 40 |
| Reactor 27 | 5 | 17 |

The differential temperatures across the reactors in the operation in accordance with my invention are 70, 40, and 17, respectively; while by conventional operation the differential temperatures are 85, 30, and 5, respectively. The coke deposited is considerably less when operating in accordance with my invention as shown in the above table. Further, the coke laydowns on the catalysts in the second and third reactors, for the same length run in each operation, are less when operating in accordance with my invention. In conventional operations, the coke contents of the catalysts in the second and third reactors are the bottlenecks requiring shut down of the process. My operation minimizes the heavy coke laydowns in the second and third reactors allowing longer on stream time for the operation.

Reasonable variation and modification are possible within the scope of the foregoing disclosure, drawing and the appended claims to the invention, the essence of which is that the naphthenics concentration in a charge to a reforming zone is controlled thereby controlling the temperature or temperature drop in and across said zone and that in a plurality of zones through which a charge is fed serially the effluent from a first zone is admixed with a naphthenic material to increase its naphthenic content before it is passed into an ensuing zone, etc., substantially as set forth and described herein.

I claim:

1. A method for the reforming of a naphthenic gasoline hydrocarbon fraction also containing non-naphthenic constituents which comprises feeding said fraction as the sole hydrocarbon feed stream to a reforming zone and controlling the temperature of said reforming zone in which said hydrocarbon fraction is reformed to a desired predetermined temperature by varying the proportion of naphthenic hydrocarbon in the charge to said zone responsive to the temperature of said zone to maintain said desired predetermined temperature.

2. A method of operating a plurality of reforming reactors to which a naphthenic gasoline hydrocarbon charge also containing non-naphthenic constituents is fed in series as sole hydrocarbon feed stream charged to said reactors and in each of which reactors it is desired to maintain, respectively, a predetermined temperature which comprises varying the charge to each reactor and varying the charge to each of said reactors, respectively, responsive to the predetermined temperature in each of said rectors to contain a proportion of naphthenic hydrocarbon adapted and sufficient to control the temperature of each reactor to which it is charged to maintain in each reactor, respectively, the predetermined temperature desired in each of said reactors.

3. A method for reforming a naphthenic hydrocarbon charge which comprises solvent extracting said charge to obtain a naphthenics concentrate and a raffinate, charging a naphthenics containing hydrocarbon fraction also containing no n-naphthenic hydrocarbon to a first reforming reaction zone and therein reforming said charge, removing effluent from said reaction zone, varying the naphthenic content of said effluent responsive to the temperature of a second reforming reaction zone in which a predetermined temperature is being maintained by admixing said effluent with at least a portion of said naphthenics concentrate, passing the admixture thus obtained to a second reforming reaction zone and recovering reformed effluent from said second reaction zone, thus maintaining said predetermined temperature in said second reforming reaction zone.

4. A method for the reforming of a hydrocarbon charge containing naphthenic and non-naphthenic molecules which comprises sensing the temperature in a reaction bed in which reforming of said hydrocarbon charge is taking place and varying the proportion of naphthenic molecules in said hydrocarbon charge responsive to said temperature.

5. A method of reforming a hydrocarbon charge containing naphthenic and non-naphthenic molecules which comprises subjecting said charge to an operation to remove therefrom a naphthenic concentrate, passing said thus treated charge to a reforming operation, sensing the temperature in said reforming operation, and proportioning said concentrate into said thus treated charge responsive to said temperature.

6. A method according to claim 5 wherein the naphthenic concentrate is obtained by solvent extraction of the charge.

7. A method for the reforming of a naphthenic gasoline hydrocarbon fraction also containing non-naphthenic constituents which comprises passing a portion of said fraction to a heating zone and then to a reforming reaction zone, solvent extracting another portion of said fraction obtaining a naphthenic extract and a paraffinic reffinate, modifying the portion of said fraction passed to said heating zone in accordance with a predetermined temperature being maintained in said zone by incorporating therewith at least a portion of said raffinate and passing the modified heated portion to said reforming reaction zone and therein reforming said modified fraction.

8. A method according to claim 7 wherein a reforming reaction zone effluent is removed from said reforming reaction zone, at least a portion of said naphthenic extract is combined therewith and the thus modified effluent is passed to a heating zone and then to a reforming reaction zone for further reforming therein.

9. A method according to claim 8 wherein an effluent is recovered from the last mentioned reforming reaction zone, a further portion of said naphthenic fraction is admixed therewith, the thus modified effluent is heated in a heating zone and then passed to a reforming reaction zone for reforming therein.

10. A method according to claim 7 wherein the proportion of paraffinic raffinate added to the portion of naphthenic fraction passed to said heating zone is controlled responsive to a temperature sensed in said reforming reaction zone.

11. A method according to claim 8 wherein the proportion of naphthenic extract added to the reforming reaction zone effluent is controlled responsive to a temperature sensed in the last mentioned reforming reaction zone.

12. A method according to claim 9 wherein the further portion of naphthenic extract which is added to said effluent is controlled responsive to a temperature sensed in the last mentioned reforming reaction zone.

References Cited in the file of this patent

UNITED STATES PATENTS

| 2,335,684 | Mayer | Nov. 30, 1943 |
| 2,630,404 | Berger | Mar. 3, 1953 |
| 2,654,694 | Berger et al. | Oct. 6, 1953 |

FOREIGN PATENTS

| 121,173 | Australia | Mar. 28, 1956 |
| 723,785 | Great Britain | Feb. 9, 1955 |